US012754320B2

(12) United States Patent
Li et al.

(10) Patent No.: US 12,754,320 B2
(45) Date of Patent: Oct. 6, 2026

(54) RADAR DETECTION METHOD AND RELATED APPARATUS

(71) Applicant: Yinwang Intelligent Technologies Co., Ltd., Shenzhen (CN)

(72) Inventors: Menglin Li, Beijing (CN); Qiang Li, Beijing (CN); Tong Jiang, Beijing (CN)

(73) Assignee: YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 930 days.

(21) Appl. No.: 18/148,622

(22) Filed: Dec. 30, 2022

(65) Prior Publication Data

US 2023/0168381 A1 Jun. 1, 2023

Related U.S. Application Data

(63) Continuation of application No. PCT/CN2020/099557, filed on Jun. 30, 2020.

(51) Int. Cl.

| | |
|---|---|
| ***G01S 17/89*** | (2020.01) |
| ***G01S 7/48*** | (2006.01) |
| ***G01S 7/481*** | (2006.01) |
| ***G01S 17/894*** | (2020.01) |

(52) U.S. Cl.

CPC .......... *G01S 17/894* (2020.01); *G01S 7/4802* (2013.01); *G01S 7/4817* (2013.01)

(58) Field of Classification Search

None

See application file for complete search history.

(56) References Cited

U.S. PATENT DOCUMENTS

| | | | |
|---|---|---|---|
| 2019/0025426 A1 | 1/2019 | Satyan et al. | |
| 2019/0025431 A1 | 1/2019 | Satyan et al. | |
| 2019/0369244 A1 | 12/2019 | Asghari et al. | |
| 2020/0150222 A1 | 5/2020 | Longman et al. | |
| 2020/0241139 A1 | 7/2020 | Roos et al. | |

FOREIGN PATENT DOCUMENTS

| | | | |
|---|---|---|---|
| CN | 107144828 A | 9/2017 | |
| EP | 0425006 A1 | 5/1991 | |
| WO | 2018202696 A1 | 11/2018 | |

*Primary Examiner* — Hovhannes Baghdasaryan

(74) *Attorney, Agent, or Firm* — Conley Rose, P.C.

(57) ABSTRACT

A radar detection method includes intercepting a plurality of measurement units (MUs) from a beat frequency signal of a radar based on a time domain sliding step, where a time domain length of each of the plurality of MUs is greater than a time domain length of a preset sliding step; determining frequency information of each MU; and obtaining a radar point cloud detection result based on the frequency information of each MU, where the detection result includes at least one of a speed of a target object or a distance of the target object.

20 Claims, 17 Drawing Sheets

RADAR DETECTION METHOD AND RELATED APPARATUS

CROSS-REFERENCE TO RELATED APPLICATIONS

This is a continuation of International Patent Application No. PCT/CN2020/099557 filed on Jun. 30, 2020, which is hereby incorporated by reference in its entirety.

TECHNICAL FIELD

This disclosure relates to the field of lidar technologies, and in particular, to a radar detection method and a related apparatus.

BACKGROUND

A frequency modulated continuous wave (FMCW) radar is a ranging device, which includes different subdivided types. For example, an FMCW radar using radio waves is referred to as an FMCW radar, and an FMCW radar using laser lights is referred to as an FMCW lidar. An FMCW radar of any type includes a structure shown in FIG. 1. In FIG. 1, the radar generates a radio frequency or laser signal on which frequency modulation is performed, and divides the generated frequency modulated signal into two channels. One channel is used as a local reference signal (or a local oscillator signal), and the other channel is emitted to a detected target object (or a reflective object) and reflected by a surface of the target object to form an echo signal.

FIG. 2 shows reference and echo signal processing by an FMCW radar. As shown in (a) in FIG. 2, a thick line indicates that frequencies of the transmitted signal and the reference signal as frequency modulated signals change over time. In the first half of time, the signal frequency increases over time, and in the second half of the time, the signal frequency decreases over time. A fine line shows a changing process of the echo signal frequency. A beat frequency signal may be output after the echo signal and the reference signal are processed through a frequency mixer. A frequency of the beat frequency signal is a frequency difference between the reference signal frequency and the echo signal frequency, as shown in (b) in FIG. 2. In an ideal condition, the beat frequency signal has a fixed frequency (as shown by a dashed-line part in the figure). As shown in (c) in FIG. 2, the frequency of the beat frequency signal may be detected by performing frequency domain analysis (usually fast Fourier transform (FFT)) on the beat frequency signal. The frequency herein is in a one-to-one correspondence with a distance to and a speed of the target object. Therefore, speed and distance information of the target object may be calculated based on the frequency of the beat frequency signal.

As shown in FIG. 3, there is usually a scanner in the lidar. The scanner emits laser lights in different directions by rotating the laser, and then gathers measurement results in all directions to obtain a three-dimensional (3D) point cloud map. FIG. 4 shows a 3D point cloud map of the lidar. A point cloud resolution of the lidar is an important indicator. A high-resolution point cloud is very important for a machine vision algorithm used for autonomous driving, and is critical to implementation of functions such as point cloud segmentation and target identification. Usually, only one measurement can be completed within a duration of an upper/lower chirp pair (that is, one frequency modulation period of a radar). In this case, a point cloud resolution (or a point cloud density or a point output rate) obtained is low. A common method for improving the point cloud resolution is to add more lasers to a lidar, for example, upgrading a 32-line lidar (that is, 32 lasers work at the same time) to a 128-line lidar (that is, there are 128 lasers or 128 lasers are simulated by optical components).

However, improving the point cloud resolution by adding hardware significantly increases costs, a size, and power consumption of the lidar.

SUMMARY

Embodiments of this disclosure disclose a radar detection method and a related apparatus, so that a point output rate (that is, a point cloud density) of a radar can be improved without lowering a signal-to-noise ratio or increasing costs significantly.

According to a first aspect, an embodiment of this disclosure discloses a radar detection method, and the method includes intercepting a plurality of measurement units (MUs) from a beat frequency signal of a radar based on a time domain sliding step, where a time domain length of each of the plurality of MUs is greater than a time domain length of a preset sliding step, determining frequency information of each MU, and obtaining a radar point cloud detection result based on the frequency information of each MU, where the detection result includes at least one of a speed of a target object or a distance of the target object.

In the foregoing method, MUs are intercepted from the beat frequency signal in a manner of sliding window, and because a time domain length of the time domain sliding step is less than the time domain length of each intercepted MU, any two adjacent MUs in time domain share a part of frequency information. Therefore, even if a large quantity of MUs are intercepted, it can still be ensured that sufficient signal energy is accumulated in each MU, to ensure a signal-to-noise ratio. Therefore, in this manner, the point output rate (that is, the point cloud density) can be improved without lowering the signal-to-noise ratio or increasing costs significantly.

In a possible implementation of the first aspect, signal energy accumulated within a time domain length of a first MU in the plurality of MUs can ensure that a signal-to-noise ratio of the first MU is higher than a preset threshold.

In a possible implementation of the first aspect, a time domain length of a second MU in the plurality of MUs is the same as a time domain length of a third MU in the plurality of MUs, or a time domain length of a second MU is different from a time domain length of a third MU.

In a possible implementation of the first aspect, the beat frequency signal of the radar includes a first slope beat frequency signal obtained by a first laser transceiver and a second slope beat frequency signal obtained by a second laser transceiver.

The intercepting a plurality of MUs from a beat frequency signal of a radar based on a time domain sliding step includes intercepting a plurality of first MUs from the first slope beat frequency signal based on the time domain sliding step, and intercepting a plurality of second MUs from the second slope beat frequency signal based on the time domain sliding step, where one MU includes one first MU and one second MU, and the first MU is synchronized with the second MU in time domain.

Optionally, the first slope is a positive slope, and the second slope is a negative slope, or the first slope is a positive slope or a negative slope, and the second slope is a zero slope.

In the foregoing method, two laser transmitters synchronously transmit laser lights, so that beat frequency signals with two different slopes can be synchronously obtained, and this shortens a time for obtaining beat frequency signals with two slopes, and improves a speed of calculating a point cloud result in radar detection.

In a possible implementation of the first aspect, the beat frequency signal of the radar includes a positive slope beat frequency signal and a negative slope beat frequency signal that are alternately obtained by a third laser transceiver in time domain, and each of the plurality of MUS includes a positive slope part and a negative slope part.

According to a second aspect, an embodiment of this disclosure provides a signal processing apparatus. The apparatus includes an interception unit configured to intercept a plurality of MUs from a beat frequency signal of a radar based on a time domain sliding step, where a time domain length of each of the plurality of MUs is greater than a time domain length of a preset sliding step, a determining unit configured to determine frequency information of each MU, and an analysis unit configured to obtain a radar point cloud detection result based on the frequency information of each MU, where the detection result includes at least one of a speed of a target object or a distance of the target object.

In the foregoing method, MUs are intercepted from the beat frequency signal in a manner of sliding window, and because a time domain length of the time domain sliding step is less than the time domain length of each intercepted MU, any two adjacent MUs in time domain share a part of frequency information. Therefore, even if a large quantity of MUs are intercepted, it can still be ensured that sufficient signal energy is accumulated in each MU, and to ensure a signal-to-noise ratio. Therefore, in this manner, the point output rate (that is, the point cloud density) can be improved without lowering a signal-to-noise ratio or increasing costs significantly.

In a possible implementation of the second aspect, signal energy accumulated within a time domain length of a first MU in the plurality of MUs can ensure that a signal-to-noise ratio of the first MU is higher than a preset threshold.

In a possible implementation of the second aspect, a time domain length of a second MU in the plurality of MUs is the same as a time domain length of a third MU in the plurality of MUs, or a time domain length of a second MU is different from a time domain length of a third MU.

In a possible implementation of the second aspect, the beat frequency signal of the radar includes a first slope beat frequency signal obtained by a first laser transceiver and a second slope beat frequency signal obtained by a second laser transceiver. The interception unit is further configured to intercept a plurality of first MUs from the first slope beat frequency signal based on the time domain sliding step, and intercept a plurality of second MUs from the second slope beat frequency signal based on the time domain sliding step, where one MU includes one first MU and one second MU, and the first MU is synchronized with the second MU in time domain.

Optionally, the first slope is a positive slope, and the second slope is a negative slope, or the first slope is a positive slope or a negative slope, and the second slope is a zero slope.

In the foregoing method, two laser transmitters synchronously transmit laser lights, so that beat frequency signals with two different slopes can be synchronously obtained, and this shortens a time for obtaining beat frequency signals with two slopes, and improves a speed of calculating a point cloud result in radar detection.

In a possible implementation of the second aspect, the beat frequency signal of the radar includes a positive slope beat frequency signal and a negative slope beat frequency signal that are alternately obtained by a third laser transceiver in time domain, and each of the plurality of MUs includes a positive slope part and a negative slope part.

According to a third aspect, an embodiment of this disclosure provides a processor. The processor is configured to invoke a computer program stored in a computer-readable storage medium, to implement the method described in any one of the first aspect or a possible implementation of the first aspect.

According to a fourth aspect, an embodiment of this disclosure provides a lidar system. The lidar system includes a processor, a memory, and a laser. The laser is configured to transmit a laser signal. The memory is configured to store a computer program. The processor is configured to invoke the computer program to implement the method described in any one of the first aspect or a possible implementation of the first aspect.

According to a fifth aspect, an embodiment of this disclosure provides a computer-readable storage medium. The computer-readable storage medium stores a computer program, and when the computer program is run on a processor, the method described in any one of the first aspect or a possible implementation of the first aspect is implemented.

DESCRIPTION OF EMBODIMENTS

The following describes embodiments of this disclosure with reference to the accompanying drawings in embodiments of this disclosure.

A lidar in embodiments of this disclosure can be applied to various fields such as intelligent transportation, autonomous driving, atmospheric environment monitoring, geographic surveying and mapping, and uncrewed aerial vehicle, and can complete functions such as distance measurement, speed measurement, target tracking, and imaging recognition.

Figure 1:
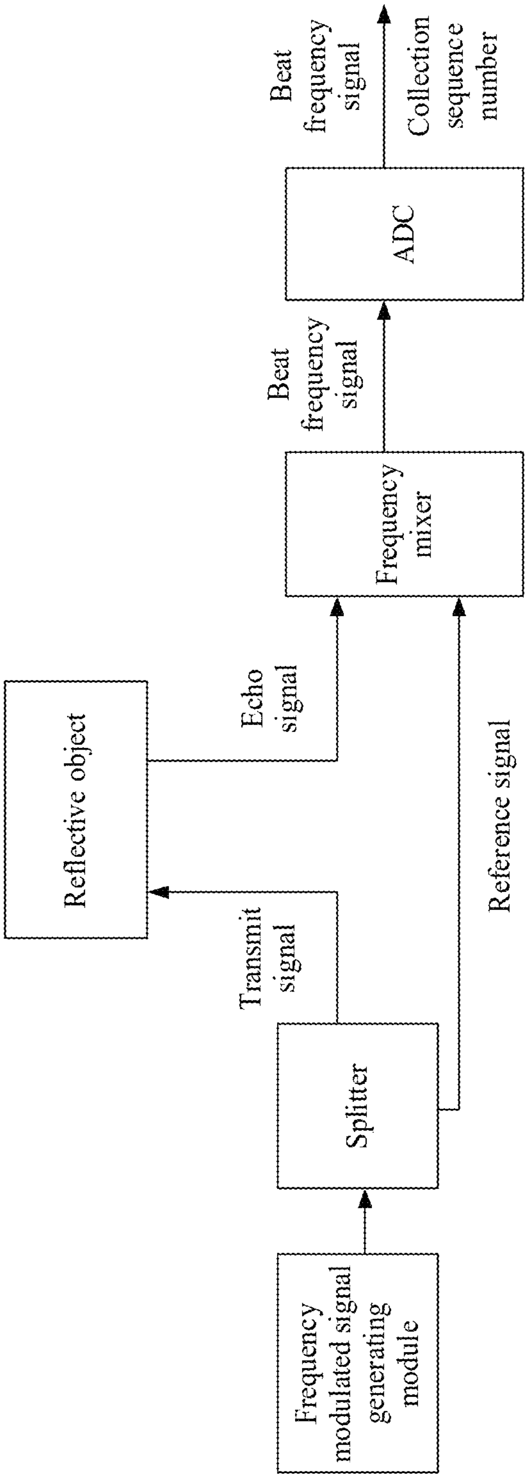
FIG. 1 is a schematic diagram of a principle of a lidar according to an embodiment of this disclosure.
Figure 2:
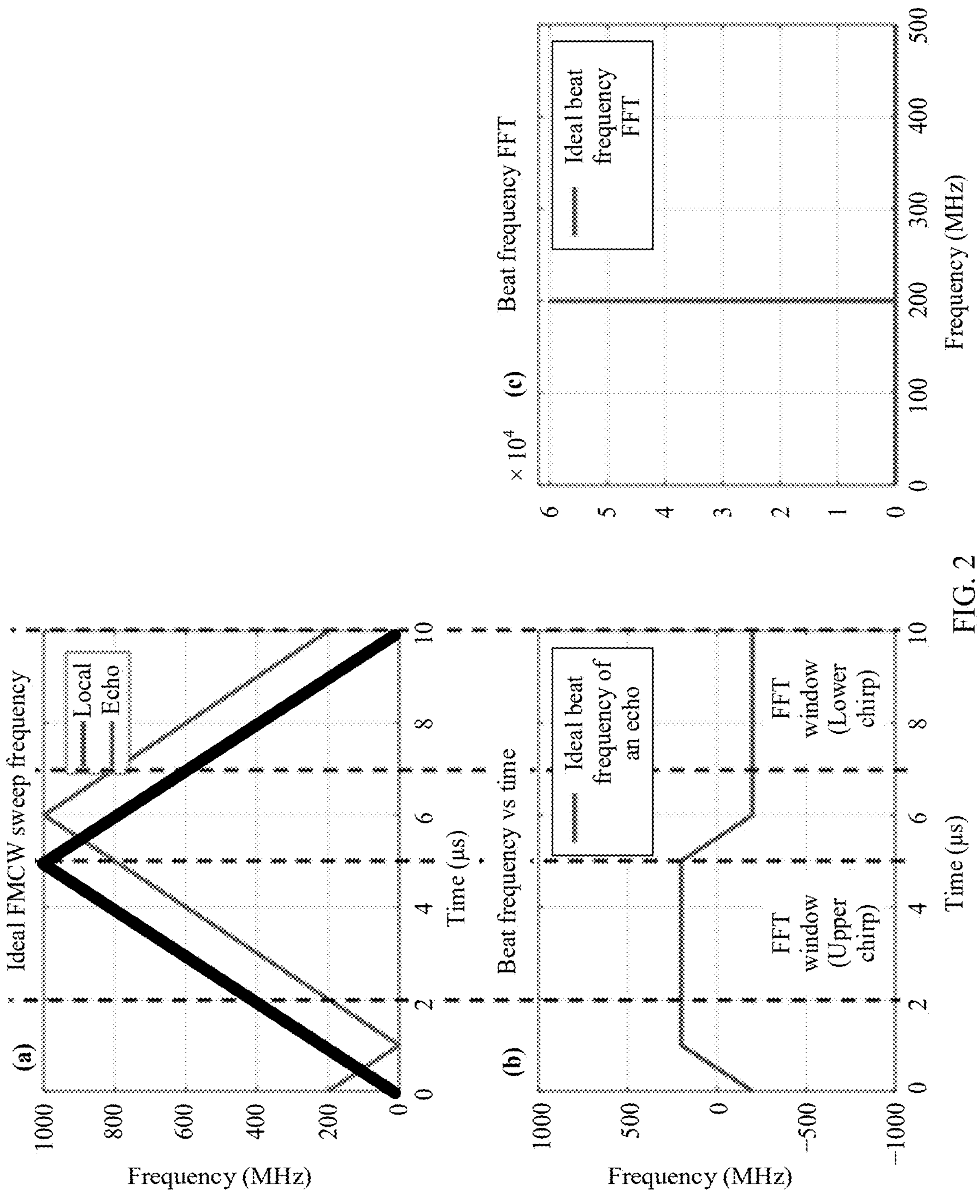
FIG. 2 is a schematic diagram of a beat frequency signal according to an embodiment of this disclosure.
Figure 3:
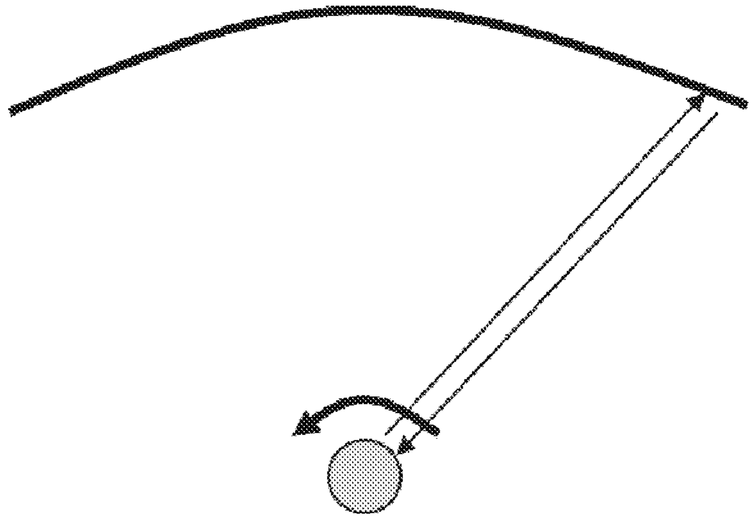
FIG. 3 is a schematic diagram of deflection during laser scanning according to an embodiment of this disclosure.
Figure 4:
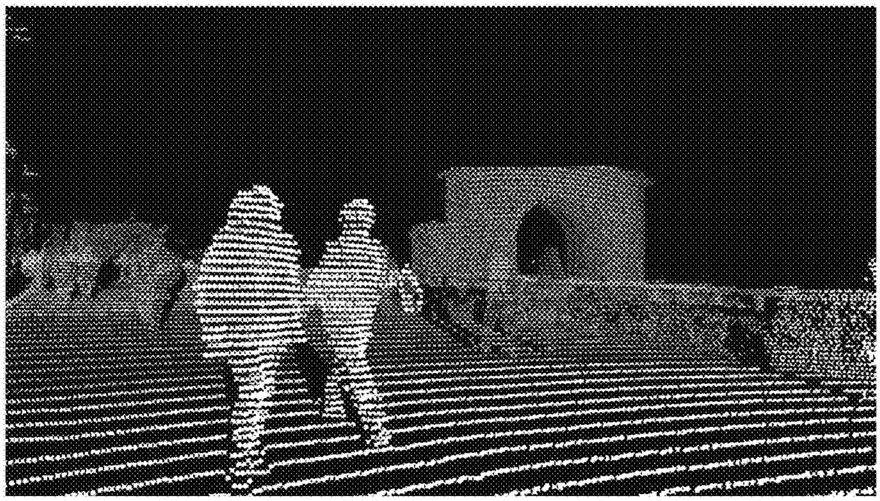
FIG. 4 is a schematic diagram of an effect of a point cloud according to an embodiment of this disclosure.
Figure 5:
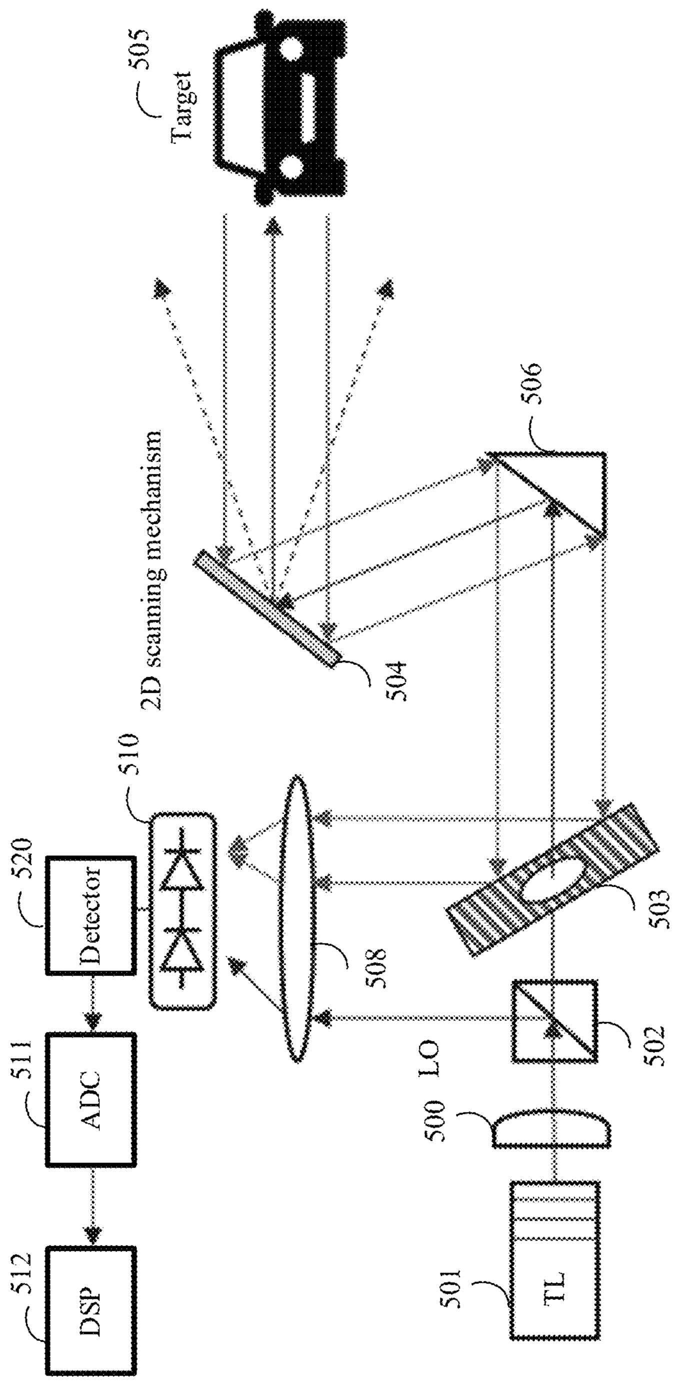
FIG. 5 is a schematic diagram of an architecture of a lidar system according to an embodiment of this disclosure.

Refer to FIG. 5. FIG. 5 is a schematic diagram of a structure of a lidar system according to an embodiment of this disclosure. The lidar system is configured to detect information about a target object 505. The lidar system includes a laser 501, which may be, for example, a frequency modulation laser (tunable laser (TL)), and is configured to generate a laser signal, where the laser signal may be a linear frequency-modulated laser signal, and a modulated waveform of a frequency of the laser signal may be a saw wave, a triangle wave, or a waveform in another form, a splitter 502 configured to split a laser light generated by the laser 501 to obtain a transmitted signal and a local oscillator signal (LO), where the local oscillator signal is also referred to as a reference signal, a collimating lens 500, which may optionally be further disposed between the laser 501 and the splitter 502, and the lens 500 is configured to perform beam shaping on a laser signal output to the splitter 502, a collimator 503 configured to couple a transmitted signal into the scanner 504 with maximum efficiency, a scanner 504, also referred to as a two-dimensional (2D) scanning device configured to transmit a transmitted signal at a specific angle, where after the transmitted signal is transmitted, the transmitted signal is reflected back by the target object 505 to form an echo signal, the scanner 504, in this case, is further configured to receive the echo signal, and after passing through a corresponding optical device (for example, a mirror reflector 506 (optional) and a receiving lens 508 (optional)), the echo signal converges with the local oscillator signal at a frequency mixer 510. The frequency mixer 510 is configured to perform frequency mixing processing on the local oscillator signal and the echo signal to obtain a beat frequency signal, a detector 520 configured to extract the beat frequency signal from the frequency mixer, where the detector 520 may be, for example, a balanced photo-detector (BPD), an analog-to-digital converter (ADC) 511 configured to sample a beat frequency signal, where this sampling is essentially a process of converting an analog signal into a digital signal, and a processor 512, where the processor may include a device having a computing capability, such as a digital signal processor (DSP), a central processing unit (CPU), an accelerated processing unit (APU), a graphic processing unit (GPU), a microprocessor, or a microcontroller, the accompanying figure uses a DSP as an example for description, and the processor is configured to process the beat signal obtained through sampling, to obtain information such as a speed and a distance of the target object.

In this embodiment of this disclosure, the target object 505 is also referred to as a reflective object. The target object 505 may be any object in a scanning direction of the scanner 504, for example, may be a person, a mountain, a vehicle, a tree, or a bridge. FIG. 5 uses a vehicle as an example for illustration.

In this embodiment of this disclosure, an operation of processing a beat frequency signal obtained through sampling to obtain information such as a speed and a distance of the target object may be completed by one or more processors 512, for example, by one or more DSPs, or may be completed by one or more processors 512 in combination with another component, for example, a DSP in combination with one or more CPUs. When processing the beat frequency signal, the processor 512 may further invoke a computer program stored in a computer-readable storage medium. The computer-readable storage medium includes but is not limited to a random-access memory (RAM), a read-only memory (ROM), an erasable programmable ROM (EPROM) or a portable ROM (i.e., compact disc (CD) ROM (CD-ROM)). The computer-readable storage medium may be disposed on the processor 512, or may be independent of the processor 512.

In this embodiment of this disclosure, there may be one or more components mentioned above. For example, there may be one or more lasers 501. When there is one laser 501, the laser 501 may alternately transmit a laser signal with a positive slope and a laser signal with a negative slope in time domain. When there are two lasers 501, one laser 501 transmits a laser signal with a positive slope, and the other laser 501 transmits a laser signal with a negative slope, and the two lasers 501 may synchronously transmit laser signals.

Figure 6:
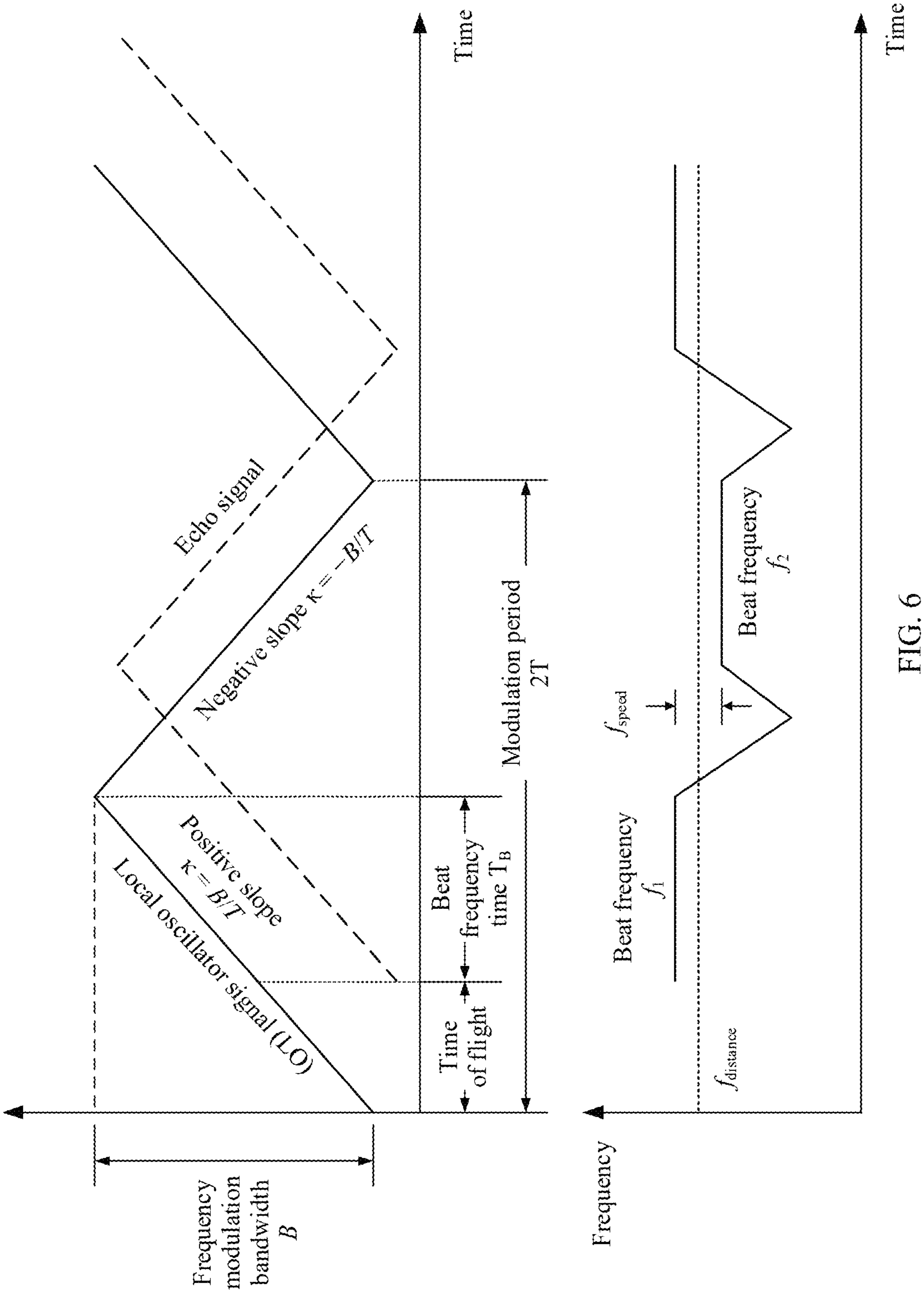
FIG. 6 is a schematic diagram of a beat frequency signal generated by a triangle wave according to an embodiment of this disclosure.

As shown in FIG. 6, for example, a modulation waveform of a laser signal frequency is triangle wave linear frequency modulation. After a period of time of flight, an echo signal is mixed with a local oscillator signal LO. This period of time of flight is a period of time from a moment when a transmitted signal divided from a laser signal starts to be emitted to a moment when the echo signal returns. After the time of flight, the echo signal and a beat frequency signal generated by the local oscillator signal are constant in a certain period of time, and can accurately reflect distance information and speed information of a target object. This period of time is a beat frequency time. The beat frequency signal needs to include a beat frequency $f_1$ corresponding to a positive slope and a beat frequency $f_2$ corresponding to a negative slope. A spectrum $f_{speed}$ related to a speed of the target object may be represented as $f_{speed}=(f_1-f_2)/2$, and a frequency $f_{distance}$ related to a distance of the target object may be represented as $f_{distance}=(f_1+f_2)/2$. After $f_{speed}$ and $f_{distance}$ are obtained, the distance between the target object (and the lidar) and the moving speed of the target object can be obtained through calculation.

To measure information about a target object at a longer distance, a coherent lidar needs to increase a beat frequency time of each measurement unit (MU) (one MU is used to obtain a detection result of one measurement point), to accumulate more energy in a process of processing the beat frequency signal, so as to achieve a higher signal-to-noise ratio. During actual implementation, the lidar is required to have a higher point output rate, so that the lidar obtains a higher field-of-view resolution and frame rate.

Figure 7:
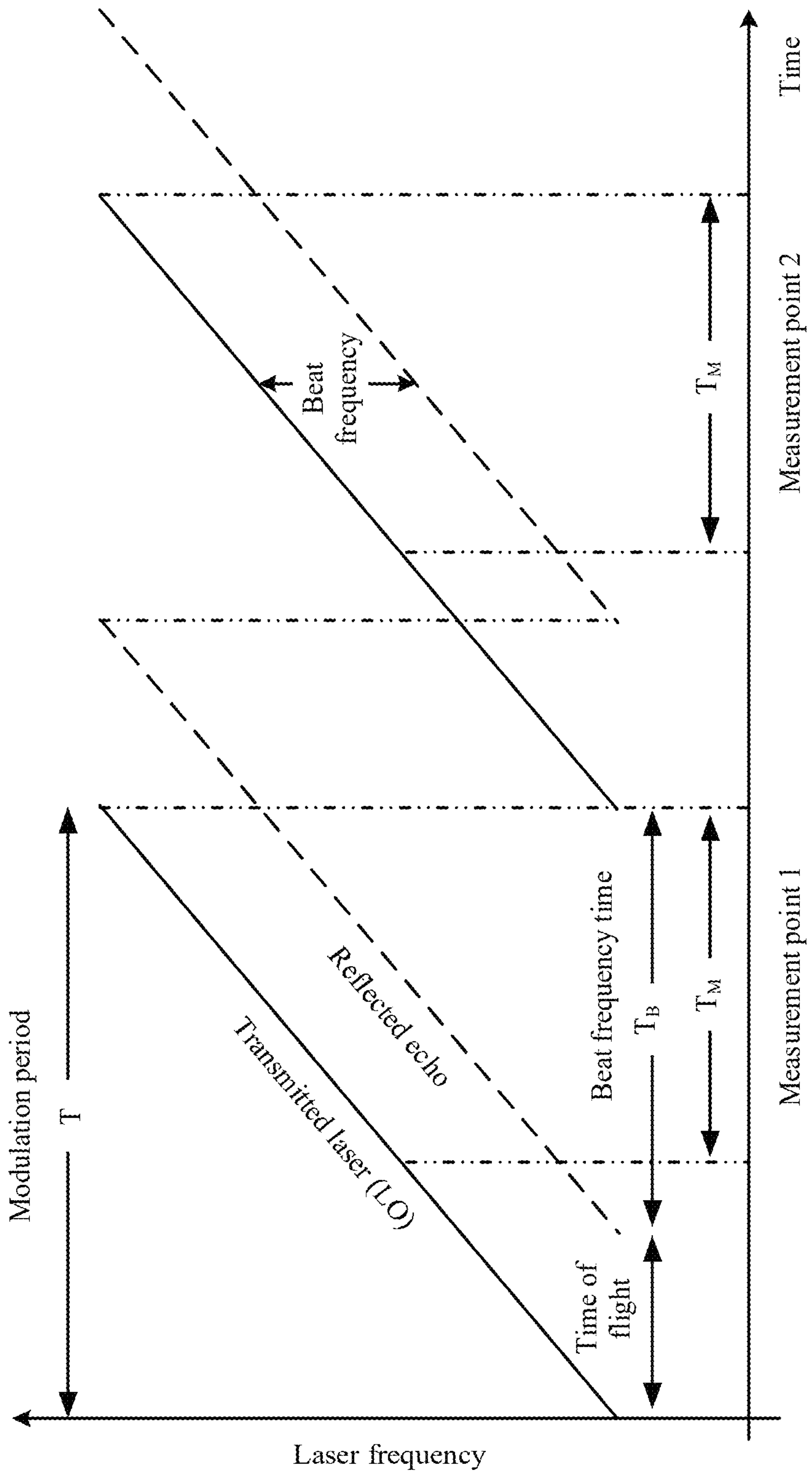
FIG. 7 is a schematic diagram of a beat frequency signal generated by a saw wave according to an embodiment of this disclosure.

A common linear frequency modulation coherent signal processing method for saw wave is shown in FIG. 7. A period of time remaining after a time of flight corresponding to a farthest detection distance is subtracted from a modulation period T is used as a beat frequency time TB, data in the beat frequency time TB is collected, Fourier transform is performed on the data to obtain a frequency of a real-time beat frequency signal, and then a distance of the target object is calculated based on the frequency. In this case, a measurement time TM of each measurement point is less than or equal to TB. Further, if other measurement channels with different linear frequency modulation slopes are used in combination, a speed of the target object can be obtained.

Figure 8:
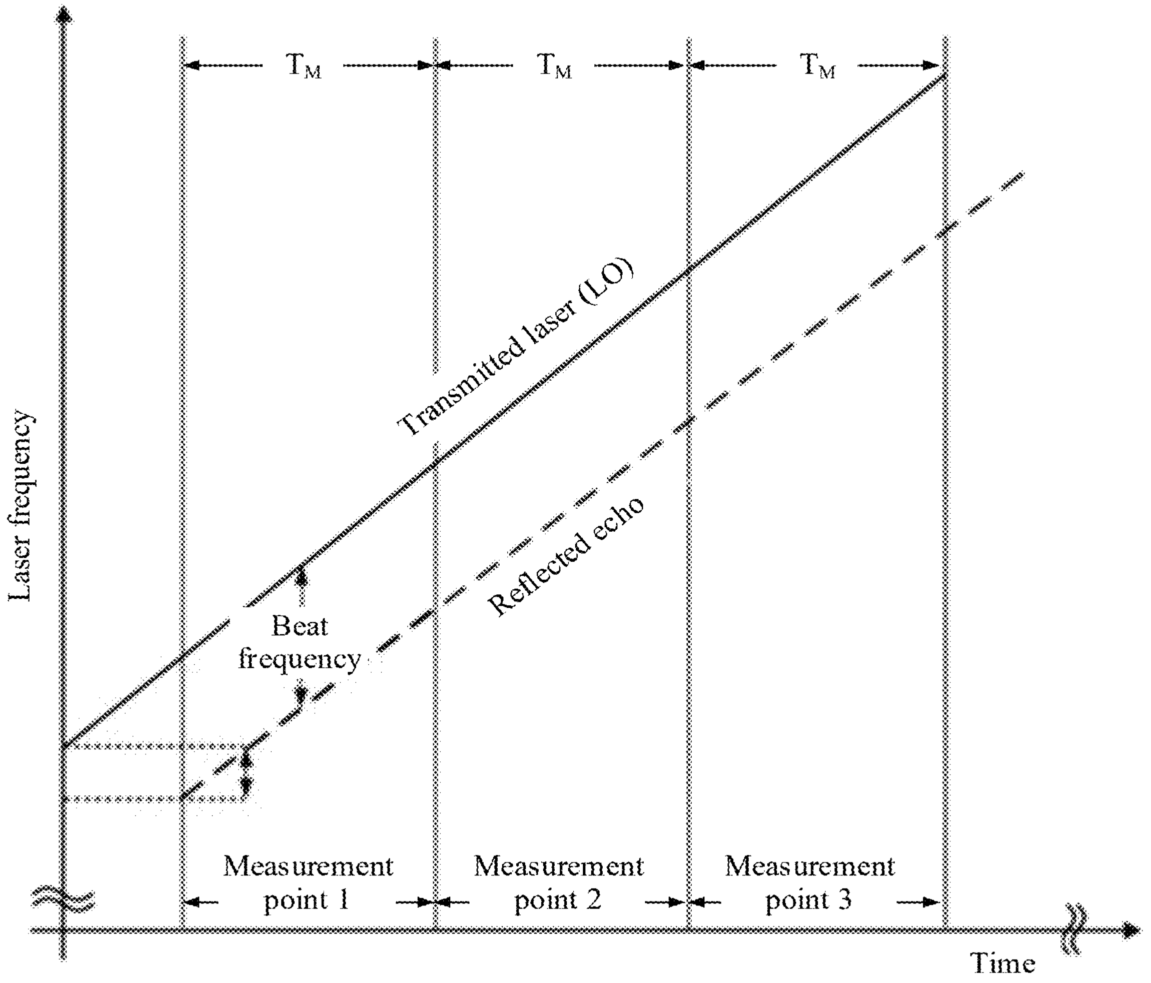
FIG. 8 is a schematic diagram of division of a beat frequency time according to an embodiment of this disclosure.

To improve a point output rate of the lidar, a plurality of MUs may be divided in a single beat frequency time. As shown in FIG. 8, a beat frequency time is divided into three segments, to obtain three MUs (corresponding to three measurement points), and one detection may be completed based on a signal of each MU. In this way, the point output rate is three times an original point output rate, and the beat frequency time of each MU is ⅓ of an original beat frequency time.

Figure 9:
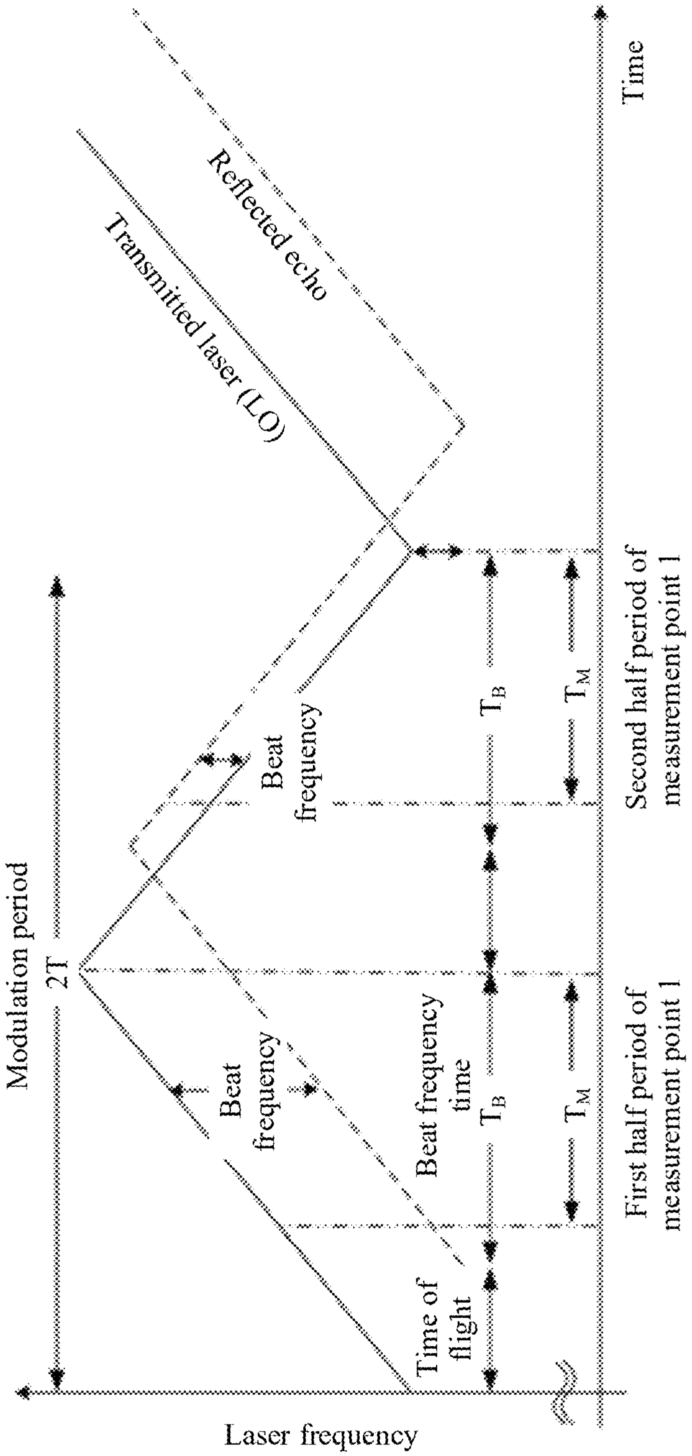
FIG. 9 is a schematic diagram of linear frequency modulation coherent digital signal processing of a triangle wave according to an embodiment of this disclosure.

A common linear frequency modulation coherent signal processing method for triangle wave is shown in FIG. 9. A time of flight and a beat frequency time are respectively divided in a positive slope modulation period and a negative slope modulation period. A signal processing manner in each beat frequency time is the same as the linear frequency modulation coherent signal processing method for saw wave. In a first half period (or a first half period corresponding to a measurement point) of the MU, a beat frequency $f_1$ is obtained through processing, and in a second half period (or a second half period corresponding to the measurement point) of the MU, a beat frequency $f_2$ is obtained through processing, so that distance information and speed information of a target can be obtained with one measurement channel.

Figure 10:
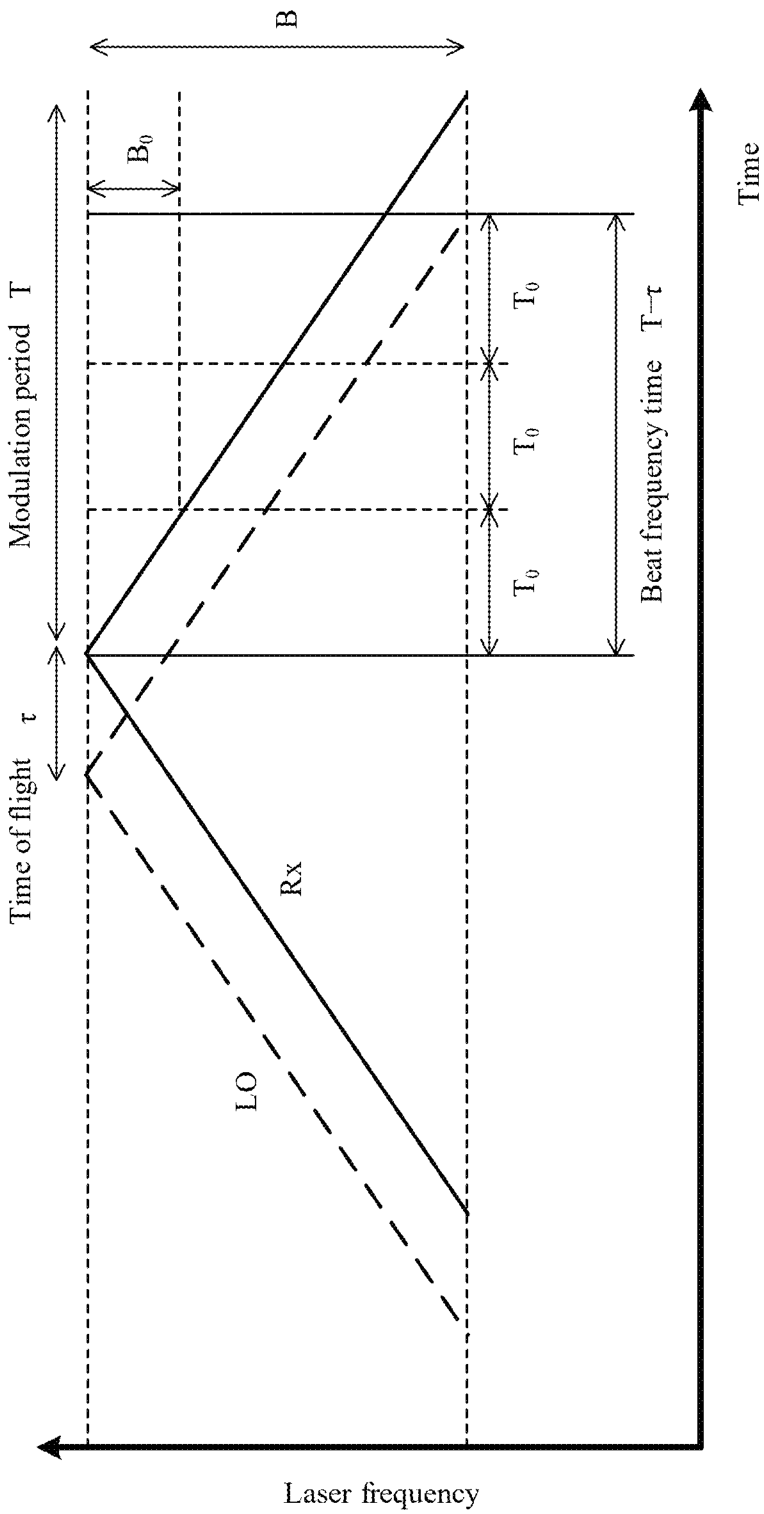
FIG. 10 is a schematic diagram of division of a beat frequency time according to an embodiment of this disclosure.

To improve a point output rate of a lidar, a beat frequency time in a positive slope period and a negative slope period may be divided into a plurality of measurement times. As shown in FIG. 10, a beat frequency time $T_\tau$ in a negative slope period are divided into three measurement times $T_0$ respectively corresponding to three MUs. Based on each MU, one detection can be completed. Therefore, the point output rate is three times an original point output rate, and the beat frequency time of each MU is ⅓ of an original beat frequency time.

It can be seen that, in the foregoing manner of improving a point output rate, a beat frequency time of each MU is reduced, and energy accumulation of a useful signal during time-frequency transform is reduced, so that a signal-to-noise ratio of measurement is affected and a detection distance of coherent measurement is reduced.

Figure 11:
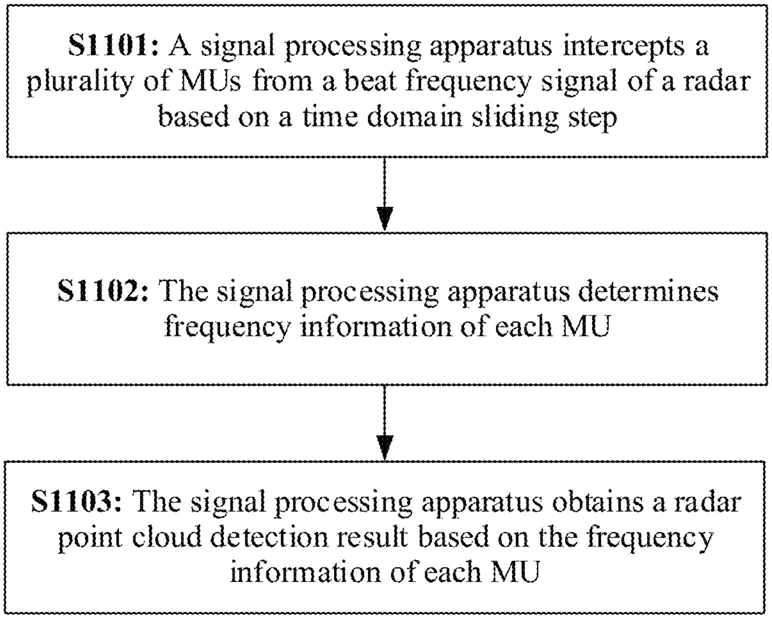
FIG. 11 is a schematic flowchart of a radar detection method according to an embodiment of this disclosure.

To ensure a high point output rate and a high signal-to-noise ratio, an embodiment of this disclosure provides the method shown in FIG. 11.

Refer to FIG. 11. FIG. 11 shows a radar detection method according to an embodiment of this disclosure. The method may be implemented based on components in the lidar system shown in FIG. 5. Some operations in subsequent descriptions are completed by a signal processing apparatus, and the signal processing apparatus may be the foregoing processor 512, or an apparatus in which the foregoing processor 512 is deployed, for example, a lidar system in which the foregoing processor 512 is deployed or a module in the lidar system. The method includes but is not limited to the following steps.

Step S1101: A signal processing apparatus intercepts a plurality of MUs from a beat frequency signal of a radar based on a time domain sliding step.

A time domain length of each MU in the plurality of intercepted MUs is greater than a time domain length of the time domain sliding step. Each MU herein is used as a measurement signal of a measurement point. Because the time domain length of each MU in the plurality of intercepted MUs is greater than the time domain length of the time domain sliding step, some beat frequency signals are repeated between any two MUs that are adjacent in time domain. This improves utilization of the beat frequency signals to a maximum extent, enhances energy of a signal in a single MU, and improves a signal-to-noise ratio.

Figure 12:
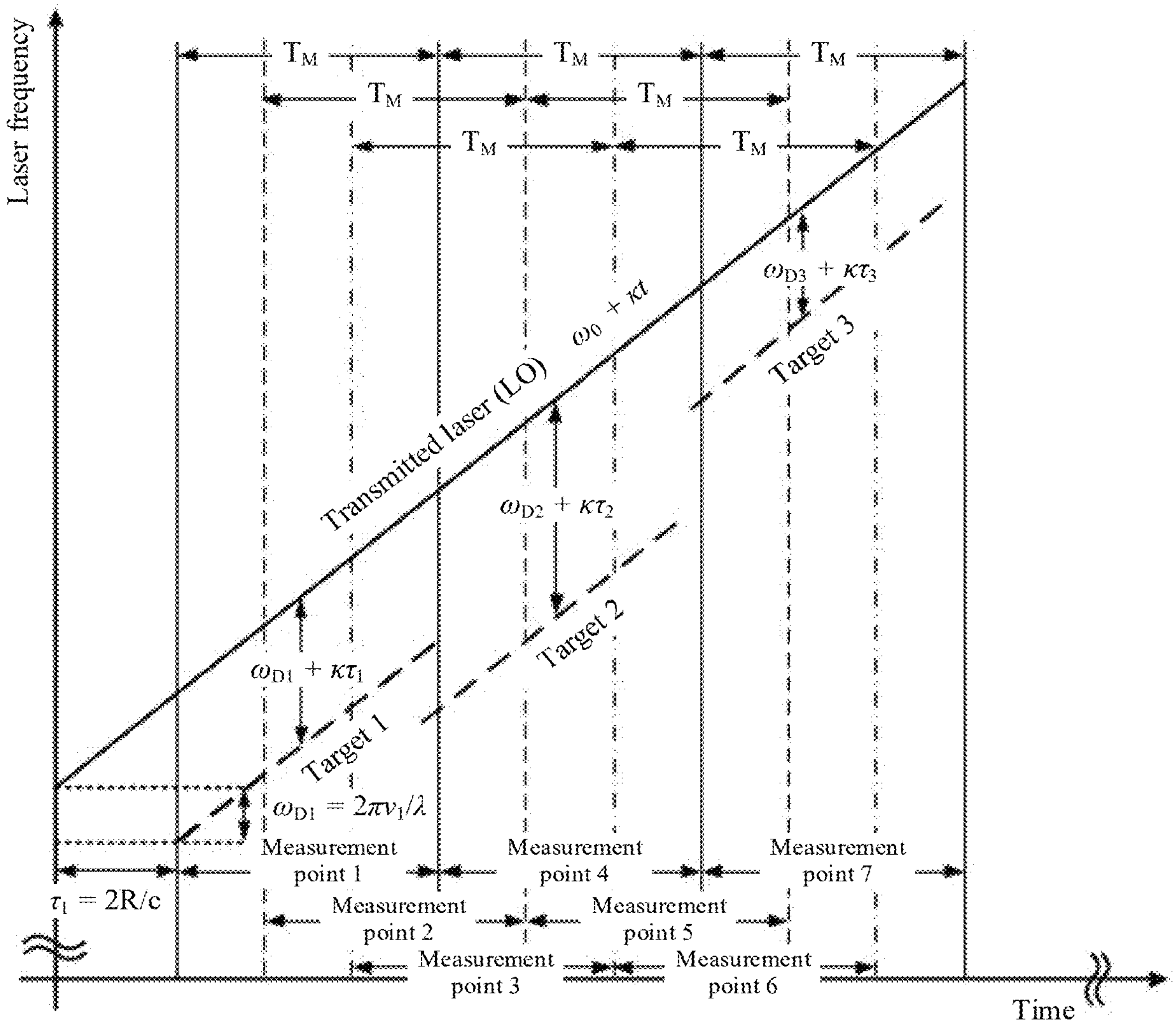
FIG. 12 is a schematic diagram of division of a beat frequency signal according to an embodiment of this disclosure.

For example, FIG. 12 shows a method for processing a linear frequency modulation coherent lidar signal modulated based on a saw wave. A scanner 504 drives a transmitted signal to deflect, so that a beam of the transmitted signal (or a laser signal) moves on surfaces of different target objects. Therefore, the target object represented by a reflected echo signal also changes with a deflection angle of the scanner 504. A beat frequency signal formed by the echo signal reflected by the target object and a local oscillator signal LO may be respectively represented as follows.

A beat frequency signal formed by an echo signal reflected by a target 1 and the local oscillator signal LO is: $\omega_{D1}+k*\tau_1$, where $\omega_{D1}=2\pi*v_1/\lambda$, $\tau_1=2R/C$, v1 refers to a speed of the target 1, $\lambda$ is a laser wavelength, R is a distance of the target 1, c is a speed of light, $\tau_1$ is a time from a moment when a laser light is emitted to a moment when the echo signal of the target 1 is reflected back to the lidar, $\omega_{D1}$ is a frequency shift of the beat frequency signal due to the speed of the target 1, and k is a frequency modulation slope of linear frequency modulation of the transmitted laser light.

A beat frequency signal formed by an echo signal reflected by a target object and the local oscillator signal LO is: $\omega_{D2}+k*\tau_2$, where $\tau_2$ is a time from a moment when a laser light is emitted to a moment when the echo signal of the target 2 is reflected back to the lidar, and $\omega_{D2}$ is a frequency shift of the beat frequency signal due to a speed of the target 2.

A beat frequency signal formed by an echo signal reflected by a target 3 and the local oscillator signal LO is: $\omega_{D3}+k*\tau_3$, where $\tau_3$ is a time from a moment when a laser light is emitted to a moment when the echo signal of the target 3 is reflected back to the lidar, and $\omega_{D3}$ is a frequency shift of the beat frequency signal due to a speed of the target 3.

When a beat frequency signal is processed, a signal is intercepted from the beat frequency signal in a segmentation manner, each segment of the signal is used as an MU, and duration of the intercepted (or sampled) MU is represented as $T_M$. After being processed, each MU can output a group of information such as distance, speed, and amplitude. In this embodiment of this disclosure, in any two MUs that are adjacent in time domain, a spacing between an interception start moment of a latter MU and an interception start moment of a previous MU is $\tau$, and $\tau<T_M$. Herein, $\tau$ is a time domain sliding step mentioned above.

Optionally, signal energy accumulated in a time domain length $T_M$ of a first MU can ensure that a signal-to-noise ratio of the first MU is higher than a preset threshold, where the first MU is any intercepted MU. In other words, the $T_M$ is not randomly selected, and is mainly selected based on a signal-to-noise ratio requirement for effectively extracting information by using a data processing method. For example, if a beat frequency is extracted by using Fourier transform, a $T_M$ is longer, more energy is accumulated in a target beat frequency, and a signal-to-noise ratio is higher. Therefore, a time domain length $T_M$ of any MU needs to be greater than a specific length, and cannot be randomly selected.

As shown in FIG. 12, for a same beat frequency duration, only three MUs (corresponding to measurement points 1, 4, and 7 respectively) can be obtained according to the conventional technology. However, according to the above-mentioned solution, seven MUs (corresponding to measurement points 1, 2, 3, 4, 5, 6, and 7) can be obtained. In this solution, more MUs are obtained, and a time domain length of each MU is not shortened. Therefore, this solution ensures a requirement of each MU on the signal-to-noise ratio, and improves a point output rate of each radar measurement channel.

There is a plurality of possible cases for time domain lengths of the foregoing MUS, and the following further describes the cases.

In an optional case 1, time domain lengths of the plurality of intercepted MUs are the same. To be specific, if any two of the MUs are selected, for example, a second MU and a third MU, a time domain length of the second MU is the same as a time domain length of the third MU.

In an optional case 2, time domain lengths of the plurality of intercepted MUs are not completely the same. To be specific, if any two of the MUs are selected, for example, a second MU and a third MU, a time domain length of the second MU may be different from a time domain length of the third MU.

In this embodiment of this disclosure, a structure of a lidar for transmitting and receiving signals may be set according to a requirement. The following two structures are used as examples in this embodiment of this disclosure, and how to intercept MUs for the two different structures is described.

Figure 13:
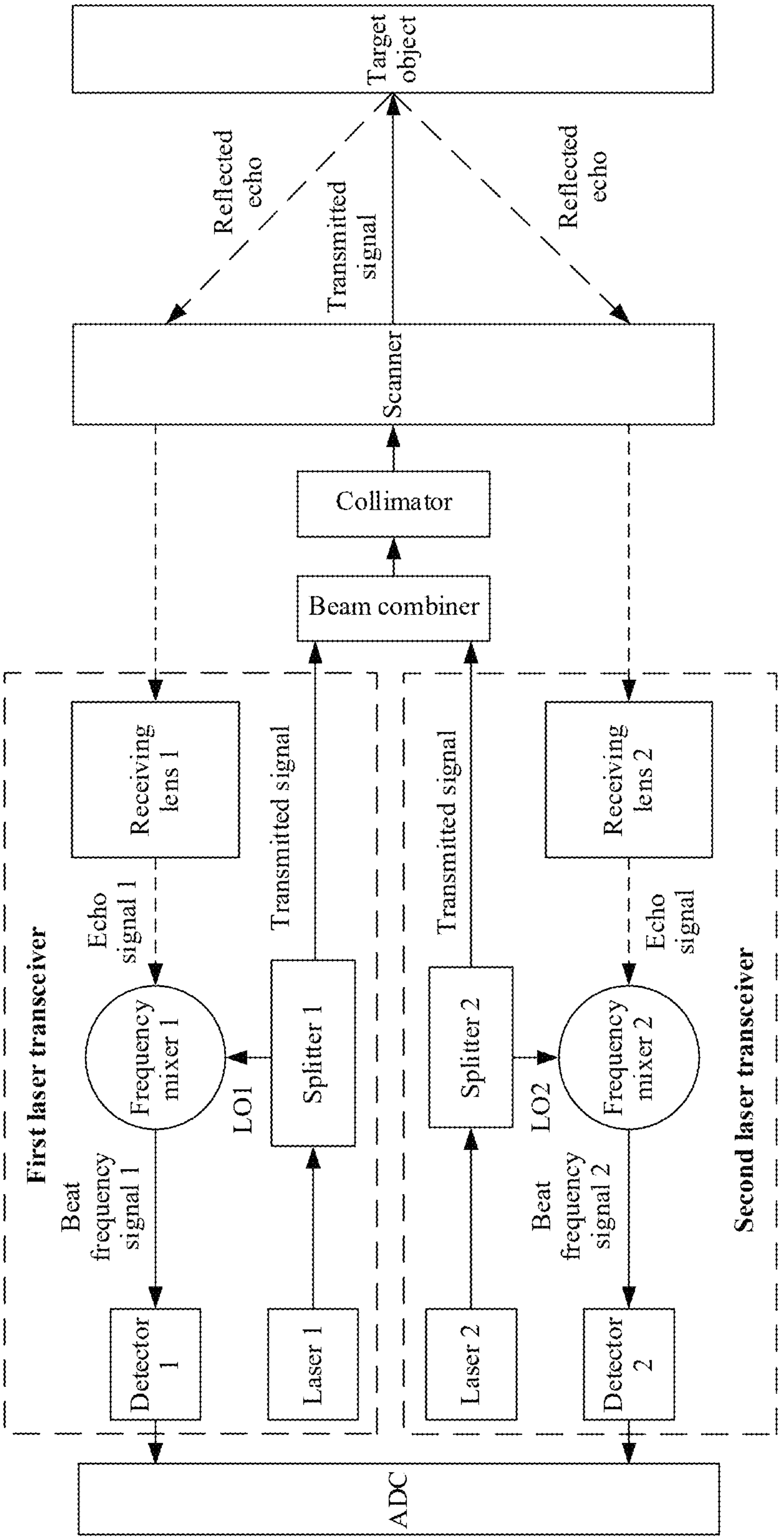
FIG. 13 is a schematic diagram of a structure of a lidar system according to an embodiment of this disclosure.

Structure 1: FIG. 13 shows a dual-channel lidar system. A structure shown in FIG. 13 may be considered as obtained by adding corresponding components based on the system shown in FIG. 5. For example, some components in FIG. 5 are doubled in quantity in FIG. 13, such as the detector and the splitter. Further, the structure shown in FIG. 13 includes an ADC, a first laser transceiver, a second laser transceiver, a beam combiner, a collimator, a scanner, and a target object. The first laser transceiver includes a laser 1, a splitter 1, a frequency mixer 1, a receiving lens 1, and a detector 1. The second laser transceiver includes a laser 2, a splitter 2, a frequency mixer 2, a receiving lens 2, and a detector 2.

In the structure shown in FIG. 13, a signal processing procedure is as follows.

The laser 1 is used for modulation of a first slope. A frequency change curve of the laser 1 may be represented as $\omega(t)=\omega_1+\kappa t$, which may be referred to as a frequency of the laser 1. A laser signal generated by the laser 1 is split by the splitter 1 to obtain a local oscillator signal LO1 and a transmitted signal.

The laser 2 is used for modulation of a second slope. A frequency change curve of the laser 2 may be represented as $\omega(t)=\omega_2-\kappa t$, which may be referred to as a frequency of the laser 2. The laser signal generated by the laser 2 is split by the splitter 2 to obtain a local oscillator signal LO2 and a transmitted signal.

Optionally, signal receiving and sending of the first laser transceiver and signal receiving and sending of the second laser transceiver are synchronous.

The transmitted signals obtained through splitting by the splitter 1 and the splitter 2 are combined at the beam combiner, and then transmitted to the scanner through the collimator. The scanner transmits the transmitted signals to the target object at a certain angle. Correspondingly, the target object reflects an echo to the scanner to form an echo signal. One part of the echo signal (that is, an echo signal 1) passes through the receiving lens 1 and arrives at the frequency mixer 1, and the other part of the echo signal (that is, an echo signal 2) passes through the receiving lens 2 and arrives at the frequency mixer 2.

The frequency mixer 1 mixes the echo signal 1 and the local oscillator signal LO1 to obtain a beat frequency signal 1, and the obtained beat frequency signal 1 is a first slope beat signal.

The frequency mixer 2 mixes the echo signal 2 and the local oscillator signal LO2 to obtain a beat frequency signal 2, and the obtained beat frequency signal 2 is a second slope beat signal.

The detector 1 correspondingly collects the beat frequency signal 1, and the detector 2 correspondingly collects the beat frequency signal 2.

As shown in FIG. 13, if a beat frequency shift that is generated due to a distance and that is of a target 1 is $\kappa\tau_1$, and a beat frequency shift that is generated due to a speed and that is of the target 1 is $\omega_{D1}$, the beat frequency signal 1 that is collected by the detector 1 and that is of the target 1 is $\omega_{D1}+\kappa\tau_1$, and the beat frequency signal 2 that is collected by the detector 2 and that is of the target 1 is $-\omega_{D1}+\kappa\tau_1$. Similarly, if a beat frequency shift that is generated due to a distance and that is of a target 2 is $\kappa\tau_2$, and a beat frequency shift that is generated due to a speed and that is of the target 2 is $\omega_{D2}$, the beat frequency signal 1 that is collected by the detector 1 and that is of the target 1 is $\omega_{D2}+\kappa\tau_2$, and the beat frequency signal 2 that is collected by the detector 2 and that is of the target 1 is $-\omega_{D2}+\kappa\tau_2$. In addition, a case of a beat frequency signal corresponding to a target 3 is deduced by analogy, and details are not described herein.

In the structure shown in FIG. 13, optionally, intercepting a plurality of MUs from a beat signal of a radar based on a time domain sliding step may include intercepting a plurality of first MUs from the first slope beat frequency signal based on the time domain sliding step, and synchronously intercepting a plurality of second MUs from the second slope beat frequency signal based on the time domain sliding step, where one MU includes one first MU and one second MU, and the first MU is synchronized with the second MU in time domain. It may be understood that, based on a time domain sequence, a time domain of an $i^{th}$ first MU is synchronized with a time domain of an $i^{th}$ second measurement unit, where i is a positive integer.

Figure 14:
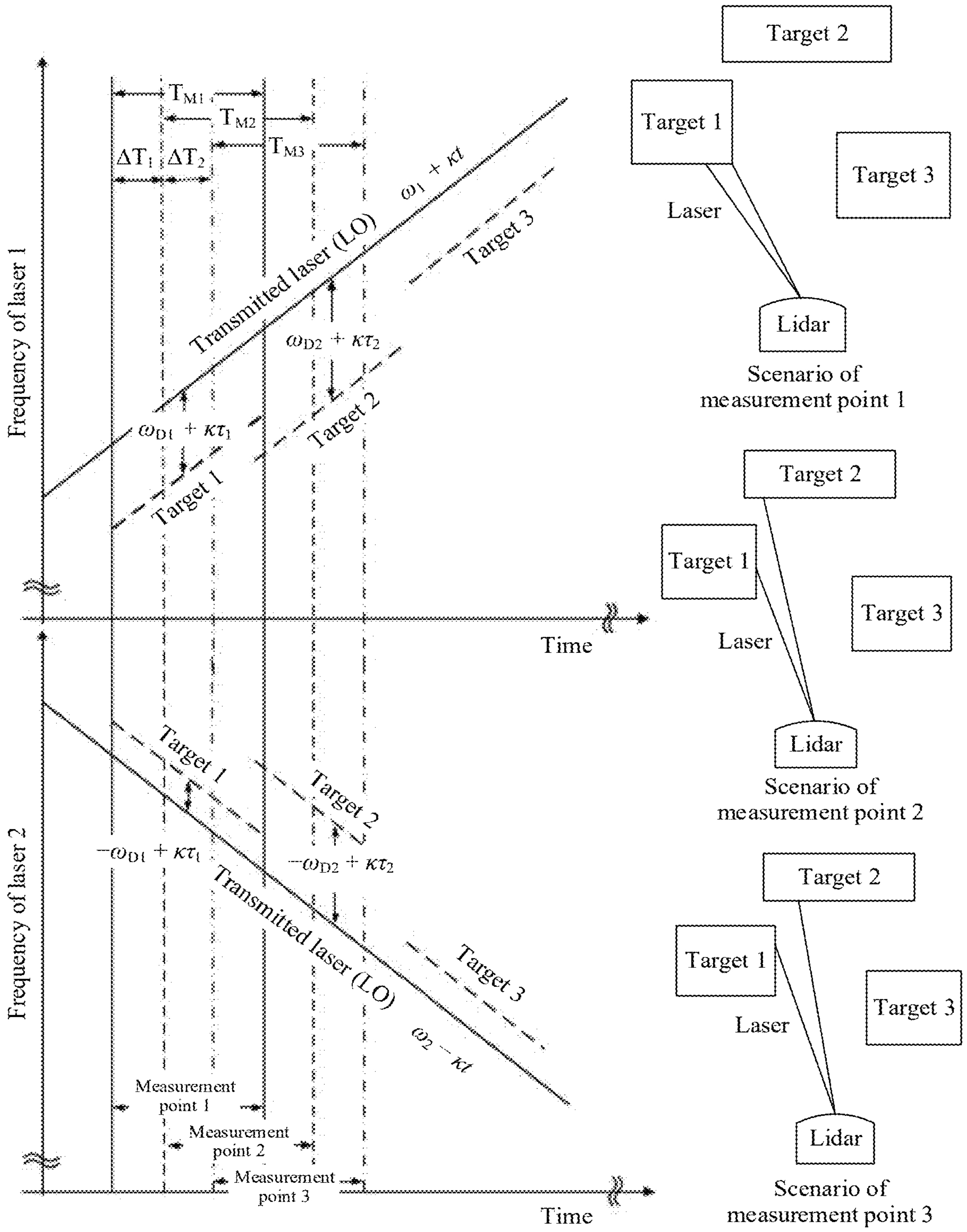
FIG. 14 is a schematic diagram of division of a beat frequency signal according to an embodiment of this disclosure.

As shown in FIG. 14, a beat frequency signal obtained in a time domain $T_{M1}$ may be referred to as an MU 1, a beat frequency signal obtained in a time domain $T_{M2}$ may be referred to as an MU 2, and a beat frequency signal obtained in a time domain $T_{M3}$ may be referred to as an MU 3. A time-domain deviation between a start point of $T_{M1}$ and a start point of $T_{M2}$ is $\Delta T_1$, and a time-domain deviation between the start point of $T_{M2}$ and a start point of $T_{M3}$ is $\Delta T_2$. Both $\Delta T_1$ and $\Delta T_2$ may be considered as the foregoing time domain sliding step, and both $\Delta T_1$ and $\Delta T_2$ are less than a time domain length of $T_{M1}$, a time domain length of $T_{M2}$, and a time domain length of $T_{M3}$. In addition, in the time domain $T_{M1}$, the MU 1 actually includes a first MU and a second MU, and the MU 1 is configured to serve as a measurement signal of the measurement point 1. In the time domain $T_{M2}$, the MU 2 actually includes a first MU and a second MU, and the MU 2 is configured to serve as a measurement signal of the measurement point 2. In the time domain $T_{M3}$, the MU 3 also includes a first MU and a second MU, and the MU 3 is configured to serve as a measurement signal of the measurement point 3.

Two rows of beat frequency signals detected by the detector 1 and the detector 2 are collected (or sampled, usually a digital signal is sampled from an analog signal) and processed synchronously by the ADC, and two signals whose time domain lengths are $T_{M1}$ after time of flight are used as measurement signals of the measurement point 1. A moment $\Delta T_1$ after the start time of the measurement point 1 is used as a start point, and two signals whose time domain lengths are $T_{M2}$ are used as measurement signals of the measurement point 2. A moment $\Delta T_2$ after the start time of the measurement point 2 is used as a start point, and two signals whose time domain lengths are $T_{M3}$ are used as measurement signals of the measurement point 3.

It is emphasized herein again that time domain lengths of MUs, such as $T_{M1}$, $T_{M2}$, and $T_{M3}$, may be equal or unequal, and time domain sliding steps, such as $\Delta T_1$ and $\Delta T_2$, may be equal or unequal. One of the criteria for determining the time domain length is the signal-to-noise ratio of the MU obtained after interception. For example, a threshold may be set. Only when a ratio of a power spectrum amplitude of a frequency component to an average power of a surrounding noise in a certain period of time is higher than this threshold, the frequency component is determined as a useful signal frequency, and then a frequency domain signal in this period of time is intercepted as an MU.

Figure 15:
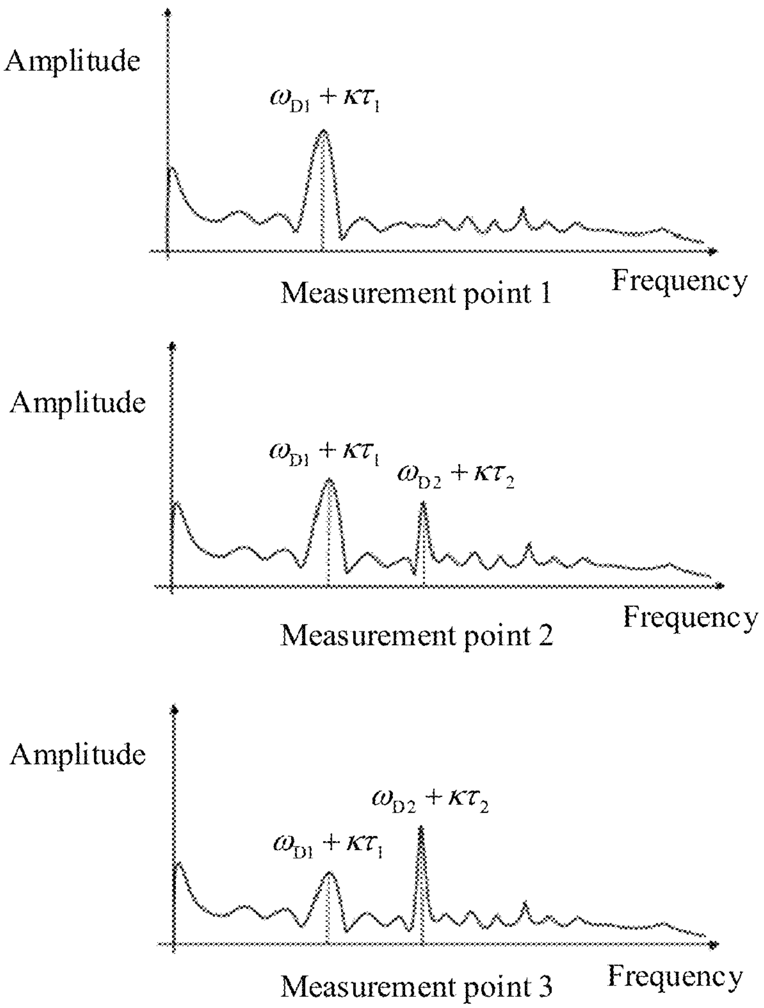
FIG. 15 is a schematic diagram of a beat frequency signal according to an embodiment of this disclosure.

Subsequently, when a power spectrum density is calculated based on each MU, as shown in FIG. 15, a useful signal frequency including information such as a distance of a target and a speed of the target may be distinguished. In addition, a longer time domain of each MU indicates a higher spectrum amplitude of a useful signal included in the measurement unit, and this is more conducive to accurately extracting a spectrum peak value, and further improves detection accuracy of coherent measurement.

Optionally, to enable the echo signal reflected by the target 1 whose distance is $R_1$ and the echo signal reflected by the target 2 whose distance is $R_2$ to have similar signal power spectrum amplitudes, a quantity $N_1$ of sampling points corresponding to the time domain length $T_{M1}$ of the MU corresponding to the target 1 and a quantity $N_2$ of sampling points (that is, sampling points collected by the ADC) corresponding to the time domain length $T_{M2}$ of the MU corresponding to the target 2 should meet the following formula:

$$R_2^2\log\sqrt{N_2} = R_1^2\log\sqrt{N_1}.$$

Optionally, the first slope is a positive slope, and the second slope is a negative slope, or the first slope is a positive slope or a negative slope, and the second slope is a zero slope.

Figure 16:
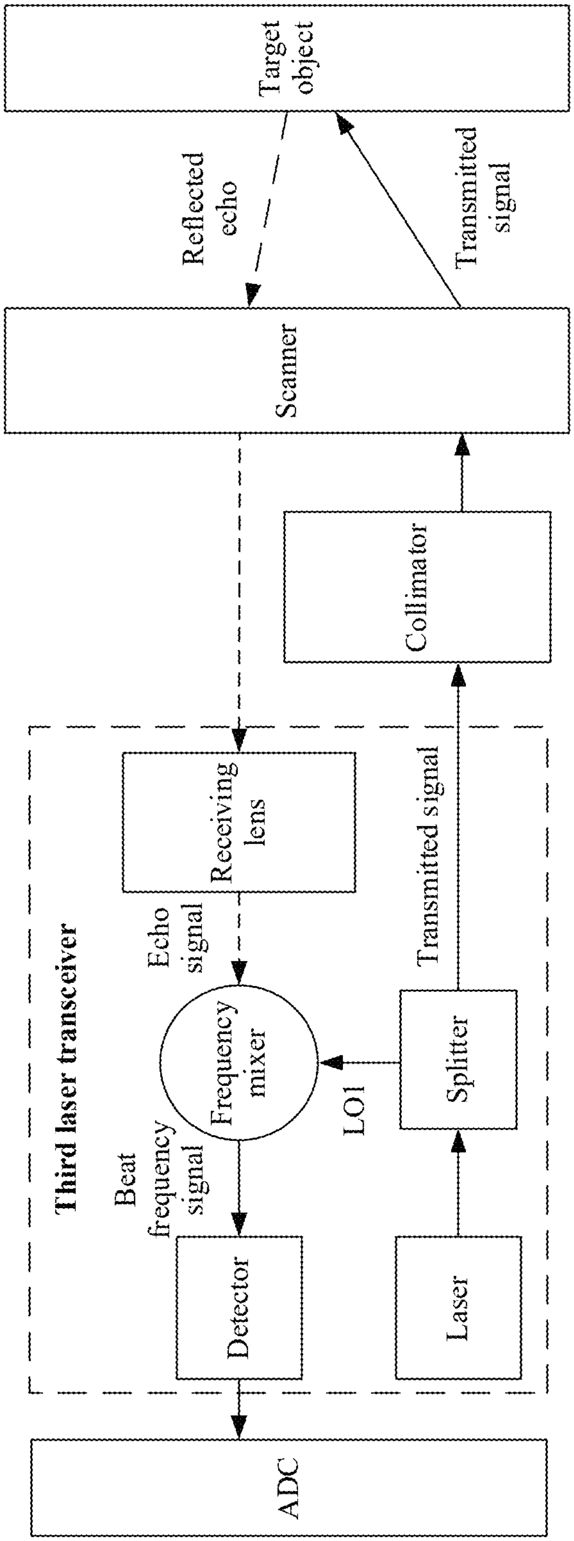
FIG. 16 is a schematic diagram of a structure of a lidar system according to an embodiment of this disclosure.

Structure 2: FIG. 16 shows a single-channel lidar system. A structure of the single-channel lidar system has one less laser transceiver than the structure shown in FIG. 13. The structure shown in FIG. 16 includes a laser transceiver, which is represented as a third laser transceiver. The third laser transceiver includes a laser, a detector, a frequency mixer, a splitter, and a receiving lens. Compared with the structure shown in FIG. 5, the structure shown in FIG. 16 has one more receiving lens. The receiving lens is disposed between the scanner and the BPD. For a basic running principle of the structure shown in FIG. 16, refer to the foregoing description of the structure shown in FIG. 5. Because the structure shown in FIG. 16 uses a single-channel lidar system, the laser may emit triangle wave linear frequency modulation laser light. A first half period of the triangle wave linear frequency modulation laser light is positive slope modulation, and a second half period is negative slope modulation, so that a frequency signal with a positive slope and a frequency signal with a negative slope are obtained. In this way, the detector may subsequently collect a positive slope beat signal and a negative slope beat signal alternately in time domain. In this case, each of the plurality of MUs intercepted based on the time domain sliding step includes a positive slope part and a negative slope part.

Figure 17:
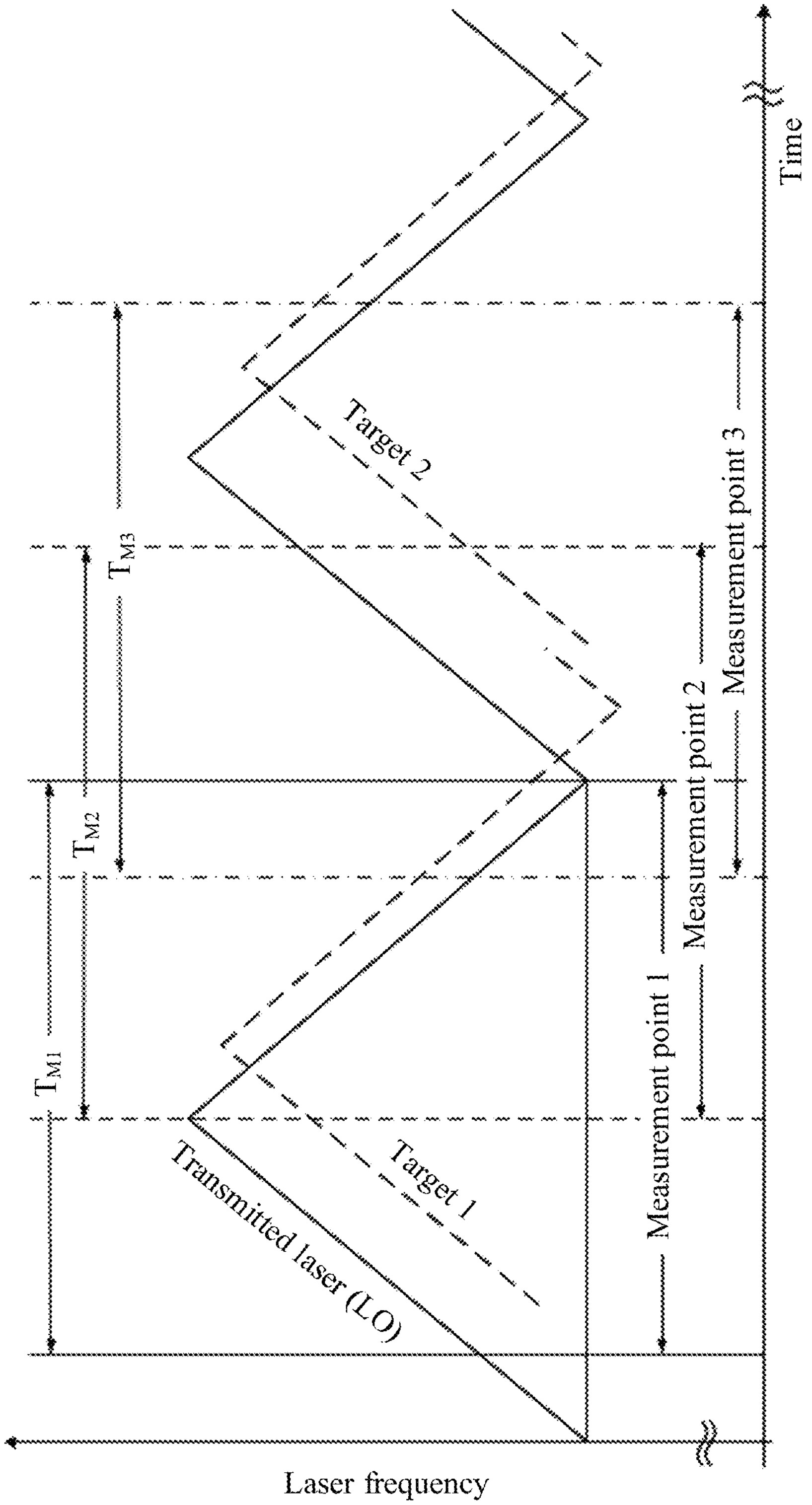
FIG. 17 is a schematic diagram of division of a beat frequency signal according to an embodiment of this disclosure.

As shown in FIG. 17, a beat frequency signal obtained in a time domain $T_{M1}$ may be referred to as an MU 1, a beat frequency signal obtained in a time domain $T_{M2}$ may be referred to as an MU 2, and a beat frequency signal obtained in a time domain $T_{M3}$ may be referred to as an MU 3. A time-domain deviation between a start point of $T_{M1}$ and a start point of $T_{M2}$ is $\Delta T_1$, and a time-domain deviation between the start point of $T_{M2}$ and a start point of $T_{M3}$ is $\Delta T_2$. Both $\Delta T_1$ and $\Delta T_2$ may be considered as the foregoing time domain sliding step, and both $\Delta T_1$ and $\Delta T_2$ are less than a time domain length of $T_{M1}$, a time domain length of $T_{M2}$, and a time domain length of $T_{M3}$. In addition, in the time domain $T_{M1}$, the MU 1 actually includes a positive slope beat frequency signal and a negative slope beat frequency signal that are staggered in time domain, and the MU 1 is configured to serve as a measurement signal of the measurement point 1. In the time domain $T_{M2}$, the MU 2 actually includes a positive slope beat frequency signal and a negative slope beat frequency signal that are staggered in time domain, and the MU 2 is configured to serve as a measurement signal of the measurement point 2. In the time domain $T_{M3}$, the MU 3 actually includes a positive slope beat frequency signal and a negative slope beat frequency signal that are staggered in time domain, and the MU 3 is configured to serve as a measurement signal of the measurement point 3.

The beat frequency signals detected by the detector are collected and processed synchronously by the ADC, and a signal whose time domain length is $T_{M1}$ after time of flight is used as a measurement signal of the measurement point 1. A moment $\Delta T_1$ after the start time of the measurement point 1 is used as a start point, and a signal whose time domain length is $T_{M2}$ is used as a measurement signal of the measurement point 2. A moment $\Delta T_2$ after the start time of the measurement point 2 is used as a start point, and a signal whose time domain length is $T_{M3}$ is used as a measurement signal of the measurement point 3.

It is emphasized herein again that time domain lengths of MUs, such as $T_{M1}$, $T_{M2}$, and $T_{M3}$, may be equal or unequal, and time domain sliding steps, such as $\Delta T_1$ and $\Delta T_2$, may be equal or unequal. One of the criteria for determining the time domain length is the signal-to-noise ratio of the MU obtained after interception. For example, a threshold may be set. Only when a ratio of a power spectrum amplitude of a frequency component to an average power of a surrounding noise in a certain period of time is higher than this threshold, the frequency component is determined as a useful signal frequency, and then a frequency domain signal in this period of time is intercepted as an MU.

Optionally, a time domain length TM of each MU should be greater than a triangle wave modulation period, and an interval between time domain starting moments of the MUs should be less than the triangle wave modulation period.

Subsequently, when a power spectrum density is calculated based on each MU, as shown in FIG. 15, a useful signal frequency including information such as a distance of a target and a speed of the target may be distinguished. In addition, a longer time domain of each MU indicates a higher spectrum amplitude of a useful signal included in the MU, and this is more conducive to accurately extracting a spectrum peak value, and further improves detection accuracy of coherent measurement.

Optionally, to enable the echo signal reflected by the target 1 whose distance is $R_1$ and the echo signal reflected by the target 2 whose distance is $R_2$ to have similar signal power spectrum amplitudes, a quantity $N_1$ of sampling points corresponding to the time domain length $T_{M1}$ of the MU corresponding to the target 1 and a quantity $N_2$ of sampling points corresponding to the time domain length $T_{M2}$ of the MU corresponding to the target 2 should meet the following formula:

$$R_2^2\log\sqrt{N_2} = R_1^2\log\sqrt{N_1}.$$

Step S1102: The signal processing apparatus determines frequency information of each MU.

Further, frequency information in an MU may be extracted by performing Fourier transform on the MU, and frequency information of each MU may be extracted by performing Fourier transform on each of the plurality of MUs. Certainly, frequency information of each MU may also be extracted in another manner.

Step S1103: The signal processing apparatus obtains a radar point cloud detection result based on the frequency information of each MU.

It may be understood that a detection result of one detection point may be obtained based on frequency information of one MU, and one detection point corresponds to one point cloud. Therefore, it may be expressed that one radar point cloud detection result is obtained based on frequency information of one MU.

The detection result includes one or more of a speed of the target object or a distance of the target object.

For the foregoing structure 1, if the first slope is a positive slope or a negative slope and the second slope is a zero slope, a frequency change $f_{speed}$ due to a speed of the target object may be obtained for a second MU intercepted for a beat frequency signal with a zero slope, and a frequency change $f_{distance}$ due to a distance of the target object may be obtained for the second MU intercepted for the beat frequency signal with the zero slope and a first MU intercepted for a beat frequency signal with a positive slope or a negative slope. Therefore, the speed and the distance of the target object may be separately obtained based on $f_{speed}$ and $f_{distance}$.

For the foregoing structure 1, if the first slope is a positive slope and the second slope is a negative slope, a power spectrum density function is implemented for a positive slope MU of each MU, to extract a spectral line higher than a preset signal-to-noise ratio threshold to serve as a useful frequency signal $f_1$, and the power spectrum density function is implemented for a negative slope MU of each MU, to extract a spectral line higher than a preset signal-to-noise ratio threshold to serve as a useful frequency signal $f_2$.

For the foregoing structure 2, the power spectrum density function is implemented for a positive slope part (that is, a beat frequency signal within a half-period beat frequency time of the positive slope) of each MU to extract a spectral line higher than a preset signal-to-noise ratio threshold to serve as a useful frequency signal $f_1$, and the power spectrum density function is implemented for a negative slope part (that is, a beat frequency signal within a half-period beat frequency time of the negative slope) of each MU to extract a spectral line higher than a preset signal-to-noise ratio threshold to serve as a useful frequency signal $f_2$.

After the useful signal $f_1$ corresponding to the positive slope beat frequency and the useful signal $f_2$ corresponding to the negative slope beat frequency are obtained, the frequency $f_{distance}$ of the distance of the target object and the frequency $f_{speed}$ of the speed of the target object may be respectively obtained through calculation based on the following formulas:

$$f_{speed} = (f_1 - f_2)/2; \text{ and}$$

$$f_{distance} = (f_1 + f_2)/2.$$

After $f_{speed}$ and $f_{distance}$ are obtained, a moving speed of the target object (relative to the lidar) is obtained through calculation based on $f_{speed}$, and a distance between the target object (and the lidar) is obtained through calculation based on $f_{distance}$.

It may be understood that, for each intercepted MU, one detection result may be obtained by performing step S1103. Therefore, after the same step is performed on each intercepted MU, a plurality of detection results may be obtained.

In the method shown in FIG. 11, MUs are intercepted from the beat frequency signal in a manner of sliding window, and because a time domain length of the time domain sliding step is less than the time domain length of each intercepted MU, any two adjacent MUs in time domain share a part of frequency information. Therefore, even if a large quantity of MUs are intercepted, it can still be ensured that sufficient signal energy is accumulated in each MU, to ensure a signal-to-noise ratio. Therefore, in this manner, the point output rate (that is, the point cloud density) can be improved without lowering the signal-to-noise ratio or increasing costs significantly.

The foregoing describes in detail the method in embodiments of this disclosure, and the following provides an apparatus in embodiments of this disclosure.

Figure 18:
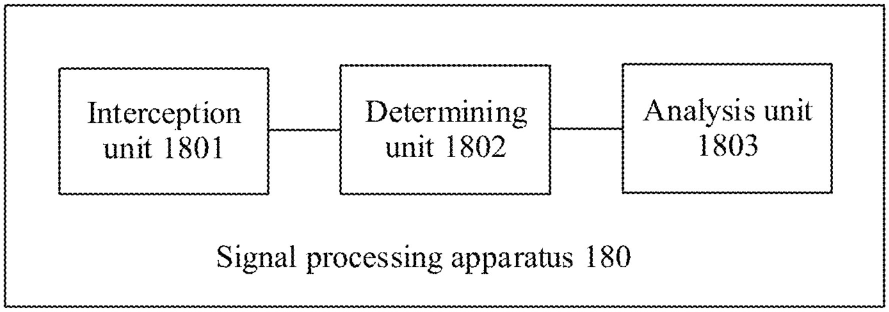
FIG. 18 is a schematic diagram of a structure of a signal processing apparatus according to an embodiment of this disclosure.

Refer to FIG. 18. FIG. 18 is a schematic diagram of a structure of a signal processing apparatus 180 according to an embodiment of this disclosure. The apparatus may be the foregoing lidar system, or a processor in the lidar system, or a related component used to deploy the processor in the lidar system. The signal processing apparatus 180 may include an interception unit 1801, a determining unit 1802, and an analysis unit 1803. The following describes the units in details.

The interception unit 1801 is configured to intercept a plurality of MUs from a beat frequency signal of a radar based on a time domain sliding step, where a time domain length of each of the plurality of MUs is greater than a time domain length of a preset sliding step.

The determining unit 1802 is configured to determine frequency information of each MU.

The analysis unit 1803 is configured to obtain a radar point cloud detection result based on the frequency information of each MU, where the detection result includes at least one of a speed of a target object or a distance of the target object.

In the foregoing method, MUs are intercepted from the beat frequency signal in a manner of sliding window, and because a time domain length of the time domain sliding step is less than the time domain length of each intercepted MU, any two adjacent MUs in time domain share a part of frequency information. Therefore, even if a large quantity of MUs are intercepted, it can still be ensured that sufficient signal energy is accumulated in each MU, to ensure a signal-to-noise ratio. Therefore, in this manner, the point output rate (that is, the point cloud density) can be improved without lowering the signal-to-noise ratio or increasing costs significantly.

Optionally, signal energy accumulated within a time domain length of a first MU in the plurality of MUs can ensure that a signal-to-noise ratio of the first MU is higher than a preset threshold.

Optionally, a time domain length of a second MU in the plurality of MUs is the same as a time domain length of a third MU in the plurality of MUs, or a time domain length of a second MU is different from a time domain length of a third MU.

Optionally, the beat frequency signal of the radar includes a first slope beat frequency signal obtained by a first laser transceiver and a second slope beat frequency signal obtained by a second laser transceiver.

The interception unit is further configured to intercept a plurality of first MUs from the first slope beat frequency signal based on the time domain sliding step, and synchronously intercept a plurality of second MUs from the second slope beat frequency signal based on the time domain sliding step, where one MU includes one first MU and one second MU, and the first MU is synchronized with the second MU in time domain.

Optionally, the first slope is a positive slope, and the second slope is a negative slope, or the first slope is a positive slope or a negative slope, and the second slope is a zero slope.

In the foregoing method, two laser transmitters synchronously transmit laser lights, so that beat frequency signals with two different slopes can be synchronously obtained, and this shortens a time for obtaining beat frequency signals with two slopes, and improves a speed of calculating a point cloud result in radar detection.

Optionally, the beat frequency signal of the radar includes a positive slope beat frequency signal and a negative slope beat frequency signal that are alternately obtained by a third laser transceiver in time domain, and each of the plurality of MUs includes a positive slope part and a negative slope part.

It should be noted that for implementation of the units, refer to the corresponding descriptions in the method embodiment shown in FIG. 11.

An embodiment of this disclosure further provides a chip system. The chip system includes at least one processor, a memory, and an interface circuit. The memory, the interface circuit, and the at least one processor are interconnected through lines, and the at least one memory stores instructions. When the instructions are executed by the processor, the method procedure shown in FIG. 11 is implemented.

An embodiment of this disclosure further provides a computer-readable storage medium. The computer-readable storage medium stores instructions, and when the instructions are run on a processor, the method procedure shown in FIG. 11 is implemented.

An embodiment of this disclosure further provides a computer program product. When the computer program product is run on a processor, the method procedure shown in FIG. 11 is implemented.

In conclusion, according to embodiments of this disclosure, MUs are intercepted from the beat frequency signal in a manner of sliding window, and because a time domain length of the time domain sliding step is less than the time domain length of each intercepted MU, any two adjacent MUs in time domain share a part of frequency information. Therefore, even if a large quantity of MUs are intercepted, it can still be ensured that sufficient signal energy is accumulated in each MU, to ensure a signal-to-noise ratio. Therefore, in this manner, the point output rate (that is, the point cloud density) can be improved without lowering the signal-to-noise ratio or increasing costs significantly.

A person of ordinary skill in the art may understand that all or some of the procedures of the methods in embodiments may be implemented by a computer program instructing related hardware. The program may be stored in a computer-readable storage medium. When the program is run, the procedures of the methods in embodiments are performed. The foregoing storage medium includes any medium that can store program code, such as a ROM or a RAM, a magnetic disk or an optical disc.

What is claimed is:

1. A method comprising:

receiving a beat frequency signal of a radar;

sampling, based on a time domain sliding step, the beat frequency signal to generate measurement units (MUs), wherein a first time domain length of each of the MUs is greater than a second time domain length of a preset sliding step, wherein a third time domain length of a first MU in the MUs is different from or the same as a fourth time domain length of a second MU in the MUs, wherein each of the MUs is a measurement of the beat frequency signal during the first time domain length, and wherein the time domain sliding step and the preset sliding steps are differences in time between beginnings of adjacent MUs of the MUs;

determining frequency information of each of the MUs; and obtaining, based on the frequency information, a radar point cloud detection result comprising at least one of a speed of a target object or a distance of the target object.

2. The method of claim 1, wherein signal energy accumulated within a fifth time domain length of a third MU in the MUs indicates that a signal-to-noise ratio of the third MU is higher than a preset threshold.

3. The method of claim 1, wherein the beat frequency signal comprises a first slope beat frequency signal from a first laser transceiver and a second slope beat frequency signal from a second laser transceiver, and wherein sampling the beat frequency signal comprises:

sampling, based on the time domain sliding step, the first slope beat frequency signal to generate first MUs; and sampling, based on the time domain sliding step, the second slope beat frequency signal to generate second MUs, wherein one MU comprises one first MU and one second MU, and wherein the one first MU is synchronized with the one second MU in a time domain.

4. The method of claim 3, wherein the first slope beat frequency signal comprises a positive slope, and wherein the second slope beat frequency signal comprises a negative slope.

5. The method of claim 1, wherein the beat frequency signal comprises a positive slope beat frequency signal and a negative slope beat frequency signal that are from a laser transceiver in a time domain, and wherein each of the MUs comprises a positive slope part and a negative slope part.

6. An apparatus comprising:

a memory configured to store instructions; and a processor coupled to the memory and configured to execute the instructions to cause the apparatus to:

receive a beat frequency signal of a radar;

sample, based on a time domain sliding step, the beat frequency signal to generate measurement units (MUs), wherein a first time domain length of each of the MUs is greater than a second time domain length of a preset sliding step, wherein signal energy accumulated within a third time domain length of a first MU in the MUs indicates that a signal-to-noise ratio of the first MU is higher than a preset threshold, wherein each of the MUs is a measurement of the beat frequency signal during the first time domain length, and wherein the time domain sliding step and the preset sliding step are differences in time between beginnings of adjacent MUs of the MUs;

determine frequency information of each of the MUs; and obtain, based on the frequency information, a radar point cloud detection result comprising at least one of a speed of a target object or a distance of the target object.

7. The apparatus of claim 6, wherein a fourth time domain length of a second MU in the MUs is different from a fifth time domain length of a third MU in the MUs.

8. The apparatus of claim 6, wherein the beat frequency signal comprises a first slope beat frequency signal from a first laser transceiver and a second slope beat frequency signal from a second laser transceiver, and wherein the processor is further configured to execute the instructions to cause the apparatus to:

sample, based on the time domain sliding step, the first slope beat frequency signal to generate first MUs; and sample, the time domain sliding step, the second slope beat frequency signal to generate second MUs, wherein one MU comprises one first MU and one second MU, and wherein the one first MU is synchronized with the one second MU in a time domain.

9. The apparatus of claim 8, wherein the first slope beat frequency signal comprises a positive slope and the second slope beat frequency signal comprises a negative slope.

10. The apparatus of claim 6, wherein the beat frequency signal comprises a positive slope beat frequency signal and a negative slope beat frequency signal that are alternately from a laser transceiver in a time domain, and wherein each of the MUs comprises a positive slope part and a negative slope part.

11. A lidar system comprising:

a laser configured to transmit a laser signal; and a processor coupled to the laser, wherein the processor is configured to:

receive a beat frequency signal of a radar;

sample, based on a time domain sliding step, the beat frequency signal to generate measurement units (MUs), wherein a first time domain length of each of the MUs is greater than a second time domain length of a preset sliding step, wherein the beat frequency signal comprises a positive slope beat frequency signal and a negative slope beat frequency signal that are alternately from a laser transceiver in a time domain, and wherein each of the MUs comprises a positive slope part and a negative slope part, wherein each of the MUs is a measurement of the beat frequency signal during the first time domain length, and wherein the time domain sliding step and the preset sliding step are differences in time between beginnings of adjacent MUs of the MUs;

determine frequency information of each of the MUs; and obtain, based on the frequency information, a radar point cloud detection result comprising at least one of a speed of a target object or a distance of the target object.

12. The lidar system of claim 11, wherein signal energy accumulated within a third time domain length of a first MU in the MUs indicates that a signal-to-noise ratio of the first MU is higher than a preset threshold.

13. The lidar system of claim 11, wherein a third time domain length of a first MU in the MUs is the same as a fourth time domain length of a second MU in the MUs.

14. The lidar system of claim 11, wherein the beat frequency signal comprises a first slope beat frequency signal from a first laser transceiver and a second slope beat frequency signal from a second laser transceiver, and wherein the processor is further configured to:

sample, based on the time domain sliding step, the first slope beat frequency signal to generate first MUs; and sample, based on the time domain sliding step, the second slope beat frequency signal to generate second MUs, wherein one MU comprises one first MU and one second MU, and wherein the one first MU is synchronized with the one second MU in a time domain.

15. The lidar system of claim 14, wherein the first slope beat frequency signal comprises a positive slope or a negative slope and the second slope beat frequency signal comprises a zero slope.

16. The method of claim 3, wherein the first slope beat frequency signal comprises a positive slope or a negative slope, and wherein the second slope beat frequency signal comprises a zero slope.

17. The method of claim 1, wherein the beat frequency signal is based on a local oscillator signal and an echo signal.

18. The method of claim 1, wherein the adjacent MUs overlap in a time domain.

19. The apparatus of claim 6, wherein the beat frequency signal is based on a local oscillator signal and an echo signal.

20. The lidar system of claim 11, wherein the beat frequency signal is based on a local oscillator signal and an echo signal.

* * * * *